Patented Jan. 10, 1939

2,143,365

UNITED STATES PATENT OFFICE 2,143,365

METHOD FOR THE ELECTRICAL PURIFICATION OF SULPHUR-CONTAINING GASES

Per Henning Wilhelm Ågren, Skelleftehamn, Sweden, assignor to Bolidens Gruvaktiebolag, Stockholm, Sweden, a joint-stock company limited of Sweden No Drawing. Application November 7, 1935, Serial No. 48,671. In Sweden June 4, 1935

4 Claims. (Cl. 23—225)

This invention relates to the purification of sulphur by the precipitation of impurities therefrom, and has for its object the provision of certain improvements in the electrical precipitation of impurities from gases containing sulphur. More particularly, the invention aims to precipitate solid or liquid impurities from gases obtained in the reduction of sulphur dioxide by means of coke or other carbonaceous material. In accordance with the method of the invention, such solid impurities as ash, coke, dust and the like, and such liquid materials as tar are substantially removed from the sulphur by electrostatic precipitation.

Heretofore, attempts have been made to separate the entrained solid and liquid impurities from the gaseous products of sulphur dioxide reduction by means of electrostatic precipitators, at temperatures above the condensation temperature of sulphur. In operations of this type, the object has been to precipitate all of the impurities in the electrical precipitator without precipitating the sulphur. In actual practice it has not been possible to effect a satisfactory separation of the impurities in this manner, with the result that varying quantities of the impurities, in many instances a substantial proportion thereof, are carried along with the sulphur vapor without being separated therefrom.

This invention has for its object the removal of small solid particles and liquids from the gaseous products of sulphur dioxide reduction by means of electrical precipitation at a temperature at or below the condensation point of sulphur vapor in such manner that only a part of the sulphur contained in the gases is precipitated together with the impurities, the major portion of the sulphur being carried along with the gases.

In practice, this is accomplished in such a manner that the gas mixture containing elementary sulphur is, in the present case cooled down to the condensation point of the sulphur vapor, or immediately below said point, and is caused to pass through one or several electric gas purifying apparatus kept at the temperature in question. As a result, sulphur deposits on dust and tar particles, their volume and mass will be increased, and they travel or migrate at a high velocity to the tube wall where they separate out together with the sulphur condensed. In this way, an almost complete precipitation of all the impurities present is obtained.

Of course, it is also possible to effect the gas purification in such a manner that, at first, all of the coarser dust is separated out in one electric filter at such a high temperature that no sulphur will be condensed, remaining dust being thereafter removed in a second electric filter with simultaneous condensation of a greater or smaller portion of the sulphur contents of the gas.

The advantages involved in the application of the present invention are manifold and valuable. One of the most important advantages consists, of course, therein that the sulphur obtained gets a very high degree of purity and need not be subjected to any further refining. Another point of great importance is the increased capacity which the purification plant obtains, on the one hand, through the increased particle size of the dust and, on the other hand, due to the fact that the gas purification is carried out at as low a temperature as possible, so that the gas volume and thus the gas quantity to be purified will be as small as possible. Furthermore, the removal of the separated dust from the purifier is facilitated, in that it will be possible to draw it off in a liquid state silted in the sulphur, the removal of coal dust from an electric gas purifying apparatus in which the dust is separated out in a dry state, being extremely troublesome on account of the pyrophorous properties of the free coal dust.

Having thus described my invention I declare that what I claim is:

1. The method of precipitating impurities from gases containing elemental sulphur which comprises passing gases containing small particles of solid impurities and vaporous elemental sulphur into an electrical precipitator, condensing a minor portion of the sulphur vapor upon said particles of impurities, and effecting a precipitation of this condensed sulphur together with the said impurities.

2. Carrying out the method of claim 1 at a temperature immediately below the condensation temperature of sulphur.

3. In the method of claim 1, precipitating the sulphur in sufficient quantity to be incorporated with the impurities and be removed from the precipitator as a liquid.

4. The method of producing purified sulphur from the gaseous products of sulphur dioxide reduction which comprises, passing the gases together with their entrained impurities and sulphur vapor into an electrical precipitator at a temperature at which a portion of the sulphur vapor condenses, and precipitating the impurities together with condensed sulphur, thereby leaving the major portion of the sulphur as vapor in the gases from which the impurities have been removed.

PER HENNING WILHELM ÅGREN.